Sept. 22, 1953   R. B. NELSON   2,652,621
METHOD OF MAKING A UNITARY THERMIONIC FILAMENT STRUCTURE
Filed Feb. 25, 1949

Inventor:
Richard B. Nelson,
by His Attorney.

Patented Sept. 22, 1953

2,652,621

UNITED STATES PATENT OFFICE 2,652,621

METHOD OF MAKING A UNITARY THERMIONIC FILAMENT STRUCTURE

Richard B. Nelson, Schenectady, N. Y., assignor to General Electric Company, a corporation of New York Application February 25, 1949, Serial No. 78,401

1 Claim. (Cl. 29—155.5)

The present invention relates to a method of joining refractory metal parts and is concerned more particularly with the joining of parts of tungsten and molybdenum.

In the manufacture of electronic emission devices such as the filaments in vacuum tubes, a refractory metal such as tungsten is frequently employed. Because of the temperatures at which such filaments may operate, such parts cannot satisfactorily be joined by the usual brazing or soldering alloys.

As the method of the present invention has particular utility in the joining of refractory metal wires and filaments, it will accordingly be specifically described and illustrated with reference to such an application. More specifically the invention will be described with reference to the manufacture of a thermionic filament structure which includes the fastening of a tungsten or molybdenum overwinding wire onto a tungsten or molybdenum filament. A cathode structure of the "overwound filament" type is described, for example, in Patent 2,210,761, Hennelly.

The method of the present invention will be understood more clearly from the following detailed description with reference to the accompanying drawing in which.

Figure 1:
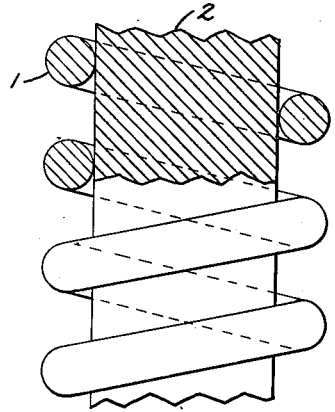
Fig. 1 is an enlarged cross-sectional view partially in section of a fragmentary portion of an "overwound filament."
Figure 2:
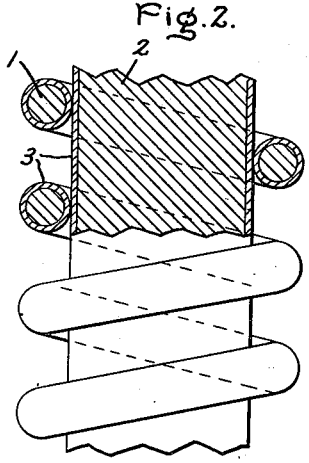
Figs. 2 and 3 are views of the same portions at successive stages of the joining method.

With reference to Fig. 1, the primary object of the present invention as applied to the illustrated cathode structure is to join or secure the overwinding 1 to the main filament or core 2 to provide a unitary structure possessing improved mechanical strength and electrical and thermal conductivity.

The desired result is obtained by subjecting the structure of Fig. 1 to a series of treatments which comprises carburizing the surface portions of the refractory metal parts 1 and 2 to form a layer of refractory metal carbide thereon, fusing the carbide layer to effect a joining of the parts, and finally reducing the carbide to the original refractory metal.

More specifically the filament 2 with the overwinding 1 is heated to an elevated temperature in a hydrocarbon atmosphere under conditions such that the refractory metal surfaces are carburized with the resultant formation of a layer of tungsten carbide 3 on the surfaces of the wire 1 and filament 2. While in the drawing a distinctive layer 3 is shown, it is to be understood that in practice there is a gradual transition from the carbide layer to the underlying metallic material. The temperatures and composition of the carburizing atmosphere are selected in view of the metal comprising the cathode structure. In the case of tungsten, a temperature of about 1800° C. is satisfactory while employing a carburizing atmosphere in the form of hydrogen saturated with benzol vapor. The thickness of the layer 3 is controlled by the time and temperature of heating.

Figure 3:
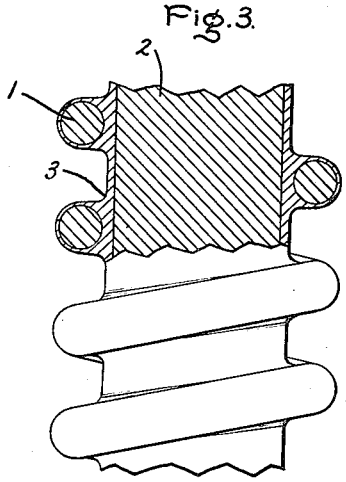
Figure 4:
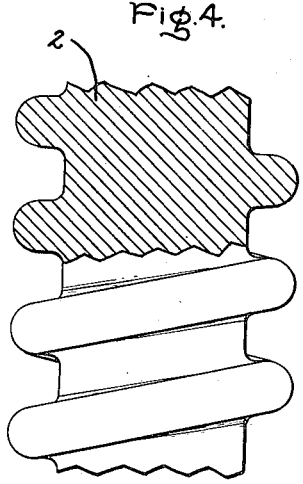
Fig. 4 is a view of the same portion illustrating the result obtained by the present invention.

The carbide coated structure is then heated, preferably in a vacuum, to a temperature above the melting point of the carbide, e. g. at about 2700° C. for tungsten carbide, and held at such temperature so that the molten carbide wets the tungsten and by surface tension is pulled into the areas at and adjacent the points of contact of the filament 2 and overwinding 1 as is shown in Fig. 3. Upon further heat treatment at a somewhat lower temperature below the melting point of the refractory metal, preferably below the melting point of the carbide, e. g. at about 2500° C., in a suitable atmosphere the metal carbide is reconverted to metal so that there is obtained a filament in the form of a single piece of metal (Fig. 4) with the joint between the filament and overwinding wire formed of refractory metal and having the same mechanical, electrical and thermal characteristic as these parts. The resultant product in fact no longer consists of two separate wires but is composed rather of a tungsten filament having a helically-extending ridge on the surface thereof.

A suitable decarburizing atmosphere for the reduction or conversion of the carbide to metal is a hydrogen atmosphere, preferably one containing some water vapor.

While the method of the present invention is particularly adapted to the joining of filamentary refractory metal parts, its application is of course not limited thereto but is generally suited to the joining of parts composed of the metals tungsten and molybdenum in a simple and efficient manner.

What I claim as new and desire to secure by Letters Patent of the United States is:

The method of making a unitary thermionic filament structure composed of a tungsten filament having a helically extending ridge on the surface thereof which comprises winding a smaller tungsten wire onto a tungsten filament, heating the resultant structure in a carburizing atmosphere to form a layer of tungsten carbide on the surfaces thereof, melting the carburized layer to cause migration thereof into the areas of contact between the filament and wire, and thereafter reducing the tungsten carbide to tungsten at an elevated temperature below the melting point of the carbide in a moist hydrogen atmosphere to produce a filament structure consisting of a single piece of tungsten.

RICHARD B. NELSON.

References Cited in the file of this patent

UNITED STATES PATENTS

| Number | Name | Date |
|---|---|---|
| 898,979 | Kuzel | Sept. 15, 1908 |
| 1,924,528 | Waltenburg | Aug. 19, 1933 |
| 2,210,761 | Hennelly | Aug. 6, 1940 |
| 2,226,944 | Reeve | Dec. 31, 1940 |
| 2,269,081 | Felsner | Jan. 6, 1942 |
| 2,319,240 | Larsen | May 18, 1943 |

FOREIGN PATENTS

| Number | Country | Date |
|---|---|---|
| 487,263 | Great Britain | June 17, 1938 |